Jan. 30, 1968   C. P. SAILA   3,366,006
SLIDE PROJECTOR FOR PRODUCING ANIMATED IMAGES
Filed Aug. 20, 1965   3 Sheets-Sheet 1

CLEMENT P. SAILA
INVENTOR.

BY
Attorney

Jan. 30, 1968  C. P. SAILA  3,366,006

SLIDE PROJECTOR FOR PRODUCING ANIMATED IMAGES

Filed Aug. 20, 1965  3 Sheets-Sheet 2

CLEMENT P. SAILA
INVENTOR.

BY

Attorney

United States Patent Office 3,366,006
Patented Jan. 30, 1968

3,366,006
SLIDE PROJECTOR FOR PRODUCING
ANIMATED IMAGES
Clement P. Saila, Islington, Ontario, Canada, assignor to
Sales Imagineering Limited, Islington, Ontario, Canada
Filed Aug. 20, 1965, Ser. No. 481,330
Claims priority, application Canada, July 12, 1965,
935,518
7 Claims. (Cl. 88—24)

ABSTRACT OF THE DISCLOSURE

The invention is directed to an apparatus for projecting animated images. A slide element having colored indicia thereon, each of said colors being deficient in the distinguishing hue of the other. By using a projector having a means to rapidly alternate the color of light emitted by the light source thereof in conjunction with said slide, an image is projected which conveys the impression of animation.

This invention relates to a slide projector and in particular to a slide projector that is capable of forming images that appear to move or be animated.

The illusion of animation has been previously utilized in display signs having coloured indicia which appear to move when the sign is illuminated by coloured lights of contrasting hues. The coloured lights are alternately projected upon the sign, and the colours of the indicia correspond with the colours of the lights. Thus, if the colours are red and green, red portions of the indicia are accentuated when red light illuminates the sign and similarly green portions of the indicia are accentuated when green light illuminates the sign. The illusion of animation is achieved by properly arranging the red and green portions of the indicia relative to each other and by flashing the red and green lights at a suitable frequency.

It is now proposed to produce animation illusion effects by projecting animated slides onto a plain reflecting surface, and a novel projector capable of accomplishing this result is disclosed herein. The animated slides have indicia of contrasting hues, and the images of the indicia formed by the projector on the reflecting surface appear to be animated. Unlike conventional animated display signs the reflecting surface is not coloured, and it can be any conventional reflector such as a movie screen or even a white or light coloured wall. The projector described herein is especially intended for children's use, so it has been designed for simplicity of operation and low cost. It is to be understood, however, that principles of the invention are applicable to more sophisticated projectors. The slides themselves are not of course animated but rather their images, but the term animated slides is convenient to describe slides which have indicia that appear animated when the slides are projected according to the invention.

Objects of the invention are therefore to provide a slide projector that is capable of forming animated images on a plain reflecting surface, and which is simple, efficient and reliable.

Figure 1:
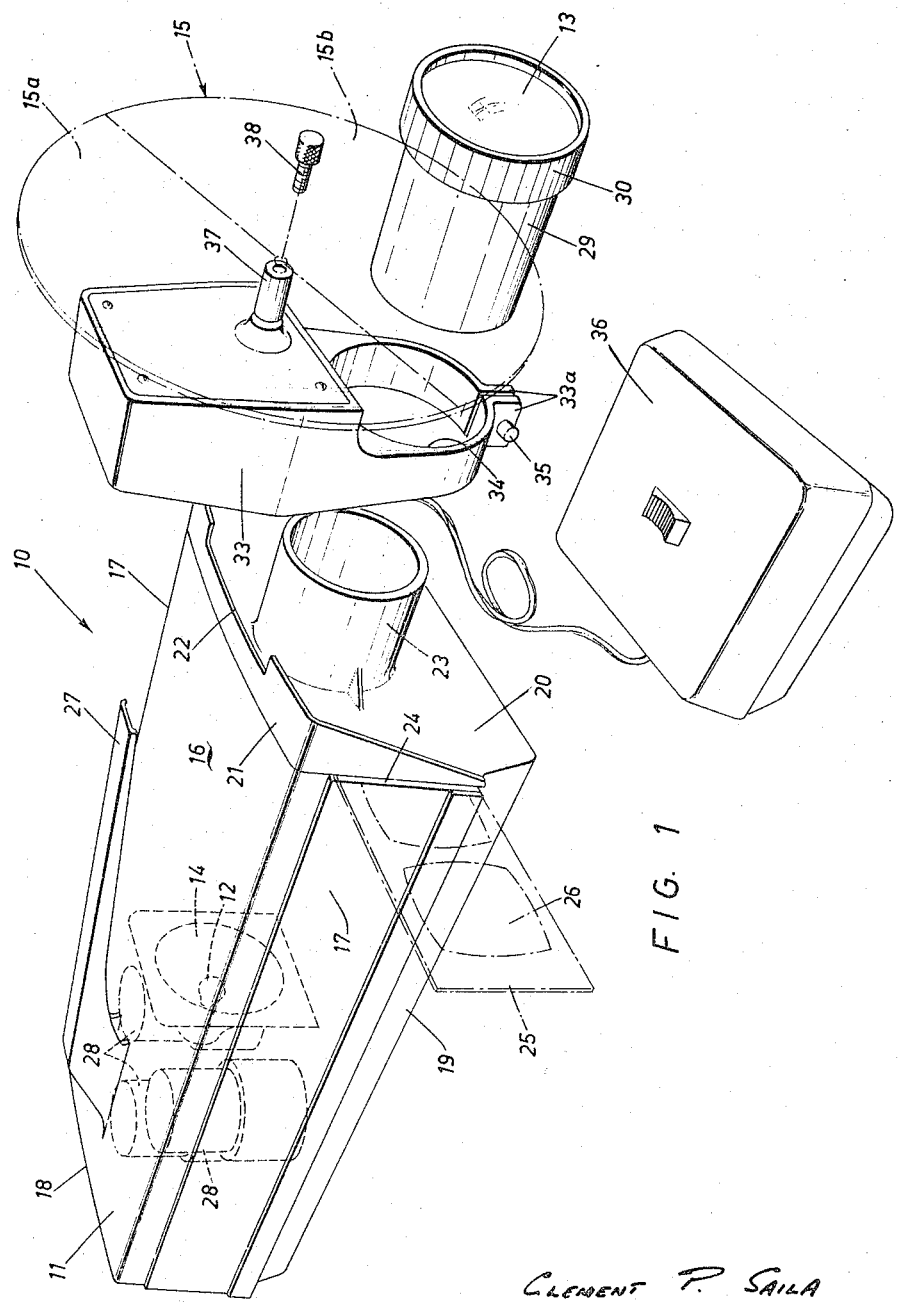
Figure 2:
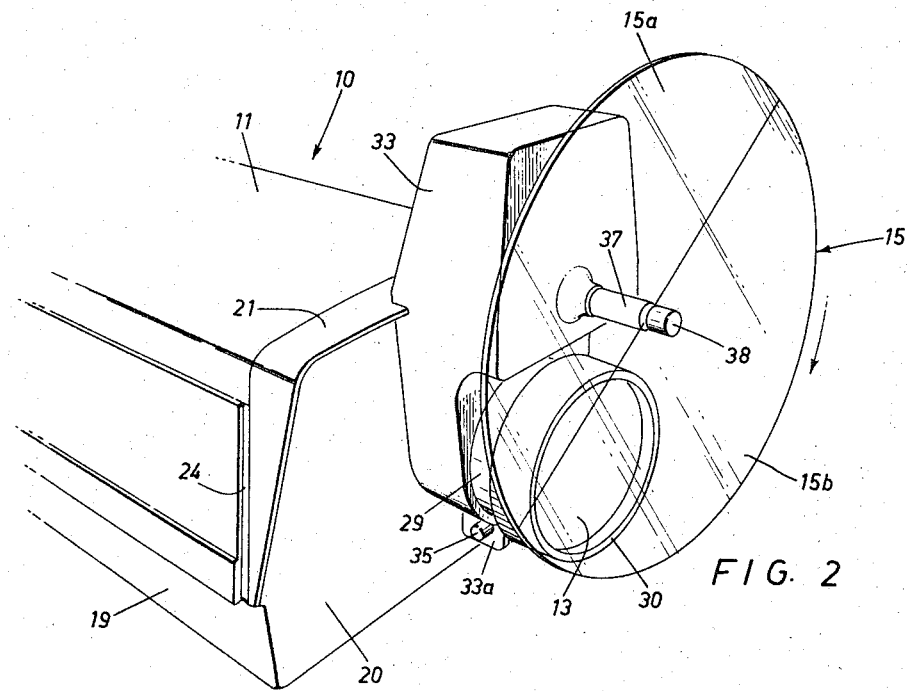
Figure 3:
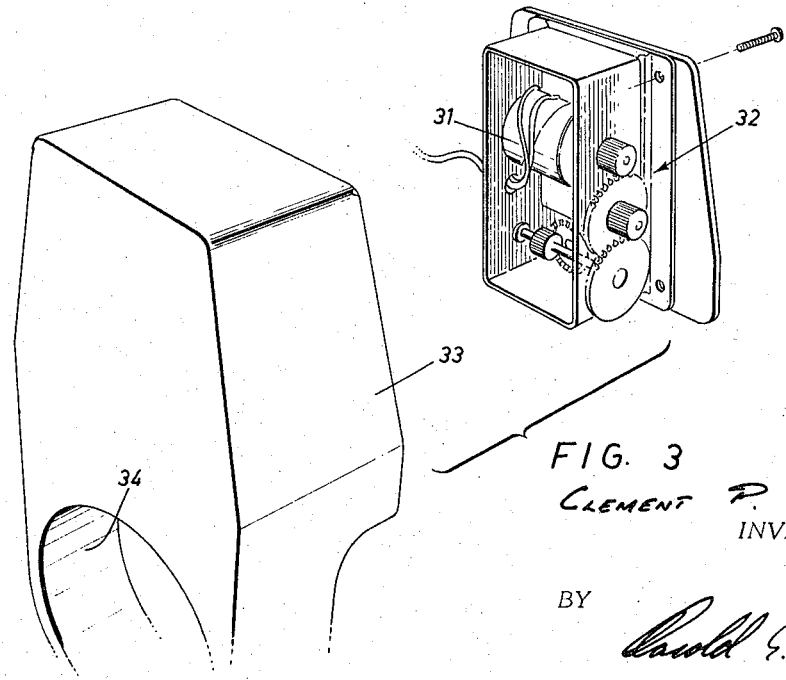
Figure 4:
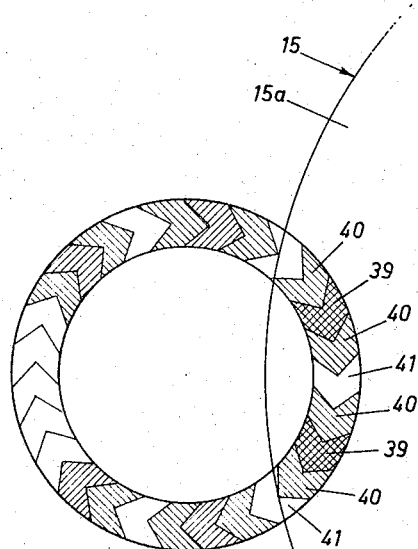
Figure 5:
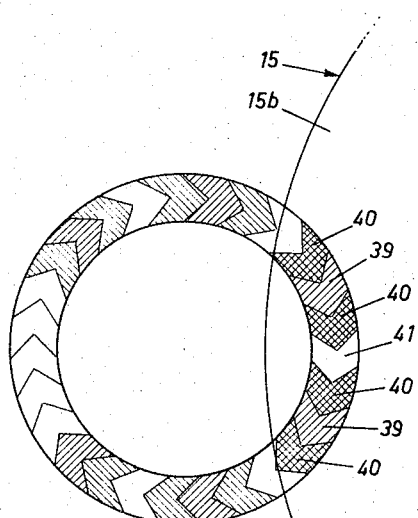

A preferred embodiment of the invention is illustrated in the accompanying drawings, wherein:

FIG. 1 is a perspective view, partly exploded, of a slide projector according to the invention, FIG. 2 is a perspective view showing a motor enclosure and a rotatable disc attached to the housing of the projector, FIG. 3 is a perspective view showing a drive mechanism for the disc, FIG. 4 is a diagrammatic view showing indicia forming a wheel with green portions of the indicia accentuated, and FIG. 5 is a diagrammatic view similar to FIG. 4 showing red portions of the indicia accentuated.

Referring to the drawings, a slide projector 10 includes a housing 11, a light source or lamp 12 in the housing 11, a lens 13 that is adapted to focus light from the light source 12 upon a plain reflecting surface (not shown), a condenser 14 for directing light from the light source 12 through the lens 13 and a rotatable disc 15 having two semicircular transparent segments 15a and 15b of contrasting colours, the colour of each segment being deficient in the distinguishing hue of the other. The colours red and green are preferred.

The housing 11 is generally rectangular and is preferably formed in two parts. One part includes a top wall 16, two opposed side walls 17 and a rear end wall 18; the other part includes a bottom wall 19 and a front end wall 20. The two parts can be separated for battery and lamp replacement. An inverted U-shaped flange 21 is formed integrally with the front end wall 20, and it is provided with a central open slot 22. Directly below the slot 22 is an open-ended sleeve 23 which is aligned with the lamp 12 and which extends normally from the front end wall 20. Narrow elongated slots 24 are provided between each side wall 17 and the adjacent portion of the flange 21 for receiving a strip 25 containing a plurality of animated slides 26. A carrying handle 27 is formed integrally with the top wall 16.

The lamp 12 is a conventional incandescent lamp of the kind commonly used in battery operated lanterns, and it is energized by three series-connected flashlight batteries 28. The condenser 14 is a reflector of the kind used in flashlights.

The lens 13 is fixed to the outer end of cylindrical tube 29 which is slidable in the sleeve 23. A ring 30 is provided at the outer end of the tube 29, and focusing is accomplished by grasping the ring 30 and sliding the tube 29 inwardly or outwardly as required.

The disc 15 is driven by an electric motor 31 through a suitable set of gears 32, as shown in FIG. 3, and the motor 31 and related gears 32 are enclosed by a motor enclosure 33. The enclosure 33 is provided at one end with a cylindrical opening 34 which is dimensioned to fit the sleeve 23. The opposed walls of the enclosure 33 which define the opening 34 terminate in a pair of opposed flanges 33a which can be drawn together by a screw 35 to clamp the enclosure 33 to the sleeve 23. When in place on the sleeve 23, the enclosure 33 engages the slot 22 which serves as a lock. The motor 31 is energized by flashlight batteries which for convenience may be stored in a separate battery enclosure 36. The disc 15 is releasably secured to a drive shaft 37 by a screw 38 having a knurled end, and as shown in FIG. 2 the disc 15 is in front of the lens 13 when it is in the operating position. Sufficient space is provided between the disc 15 and the enclosure 33 to permit the lens 13 to be focused. It has been found that a speed of about 220 revolutions per minute of the disc 15 provides excellent animation in projected slides.

The animated slides 26 comprise transparencies having a background region and coloured indicia. The background can be pictorial, for example for children's use the background can include cartoon characters. In any event the background is preferably of colours which are either substantially invisible when projected (such as black) or else of colours which are attenuated substantially equally by both coloured segments 15a and 15b of the disc 15 (such as blue, yellow, brown, gray and also clear areas in the slide, when the segments 15a and 15b are red and green).

The indicia preferably comprise small areas or narrow lines of contrasting hues, the colours of the indicia being similar to the colours of the segments 15a and 15b of the disc 15. The indicia of contrasting hues are paired, e.g., red and green areas or lines are adjacent to one another in the slide. These colours are alternately accentuated by the rotating disc 15 so that the indicia appear to be animated. Examples of such forms of indicia include a fire which appears to flicker, stars which appear to twinkle, and smoke which appears to billow out from a smoke stack.

The illusion of animation is particularly pronounced in geometrical forms such as a circle. The indicia can include coloured elemental areas in the form of arrows which are arranged side by side to define a circle. The circle appears to revolve when the slide is projected so that a circle is a desirable figure in slides of this kind. FIGS. 4 and 5 illustrate a circle composed of arrows arranged side by side, and the arrows have been appropriately shaded to show the arrows that are respectively accentuated by the green and red segments of the disc 15. Thus, in FIG. 4, the green segment is in the path of the projected light so that green arrows 39 are accentuated and in FIG. 5 the red segment is in the path of the projected light so that the red arrows 40 are accentuated. When the disc 15 revolves at a suitable frequency (e.g., 2220 r.p.m.) the circle appears to revolve in a clockwise direction.

FIGS. 4 and 5 also illustrate an unusual sequence of colours in the indicia. This sequence has been found to provide excellent animation. Note that the elemental areas of the indicia are arranged in a repetition of groups, and the sequence of the colours of the areas of each group is red, green, red, blue (reference numeral 41 denotes blue areas).

The explanation for the remarkable animation illusion produced by this sequence involves complex physiological and psychological factors, but suffice to say that this sequence is very desirable and particularly appropriate in slides of this kind.

I claim:

1. A projector for use with animated slides having coloured indicia, comprising: a housing, a light source in the housing, a lens that is adapted to focus light from the light source upon a reflecting surface, a condenser for directing light from the light source through the lens, means for holding an animated slide between the lens and the light source, and means for rapidly alternating the colour of light emitted by the light source between two contrasting colours each of which is deficient in the distinguishing hue of the other, the colours of the indicia being similar to said contrasting colours, the frequency of the colour alternation being sufficient to convey to an observer the impression of animation in an image of the animated slide formed on the reflecting surface.

2. A projector for use with animated slides having coloured indicia, comprising: a housing, a light source in the housing, a lens that is adapted to focus light from the light source upon a reflecting surface, a condenser for directing light from the light source through the lens, means for holding an animated slide between the lens and the light source, a rotatable disc having two transparent segments of contrasting colours, the colour of each segment being deficient in the distinguishing hue of the other, the colours of the indicia being similar to said contrasting colours, the disc being positioned in the path of light projected by the lens, and means for rotating the disc at a speed sufficient to convey to an observer the impression of animation in an image of the animated slide formed on the reflecting surface.

3. A projector for use with animated slides having coloured indicia, comprising: a housing, a light source in the housing, an open-ended sleeve at one end of the housing, a lens that is adapted to focus light from the light source upon a reflecting surface, a condenser for directing light from the light source through the lens, means for holding an animated slide between the lens and the light source, a rotatable disc having two transparent segments of contrasting colours, the colour of each segment being deficient in the distinguishing hue of the other, the colours of the indicia being similar to said contrasting colours, the disc being positioned in the path of light projected by the lens, a motor enclosure having an opening dimensional to fit said sleeve, means for releasably locking the motor enclosure to the sleeve, and an electric motor within the motor enclosure, the motor being coupled to the disc and being adapted to rotate the disc at a speed sufficient to convey to an observer the impression of animation in an image of the animated slide formed on the reflecting surface.

4. A projector as claimed in claim 3 wherein the lens is fixed to a tube that is slidable in said sleeve.

5. A projector as claimed in claim 3 wherein the speed of the disc is about 220 revolutions per minute, and wherein the segments are red and green.

6. A projector as claimed in claim 4 wherein the motor enclosure locking means includes a slot formed in the housing of the projector for engagement with the motor enclosure.

7. A projector for use with animated slides having coloured indicia, comprising: a housing, a light source in the housing, a lens that is adapted to focus light from the light source upon a reflecting surface, a condenser for directing light from the light source through the lens, means for holding an animated slide between the lens and the light source, the animated slide comprising a transparency having a background region and coloured indicia, the indicia including a plurality of elemental areas arranged side by side, the elemental areas forming a repetition of groups, the colours of the elemental areas of each group being arranged in the sequence red, green, red, blue, a rotatable disc having two semicircular transparent segments coloured red and green respectively, the disc being positioned in the path of light projected by the lens, and means for rotating the disc at a speed sufficient to convey to an observer the impression of animation of the projected indicia.

References Cited
UNITED STATES PATENTS

| | | | |
|---|---|---|---|
| 2,286,783 | 6/1942 | Barthel et al. | 240—3.1 |
| 2,943,185 | 6/1960 | De Mott | 240—10.1 |
| 3,104,273 | 9/1963 | Ballance | 88—24 |
| 3,154,871 | 11/1964 | Saila | 40—106.52 |

NORTON ANSHER, *Primary Examiner.*

W. M. FRYE, *Assistant Examiner.*